United States Patent
Jacobsen

(10) Patent No.: US 8,178,183 B2
(45) Date of Patent: May 15, 2012

(54) FORMABLE CORE MATERIAL

(75) Inventor: Torben Krogsdal Jacobsen, Lunderskov (DK)

(73) Assignee: LM Glasfiber A/S, Lunderskov (DK)

(*) Notice: Subject to any disclaimer, the term of this patent is extended or adjusted under 35 U.S.C. 154(b) by 710 days.

(21) Appl. No.: 11/992,733

(22) PCT Filed: Sep. 14, 2006

(86) PCT No.: PCT/DK2006/000506
§ 371 (c)(1),
(2), (4) Date: Mar. 23, 2009

(87) PCT Pub. No.: WO2007/048409
PCT Pub. Date: May 3, 2007

(65) Prior Publication Data
US 2009/0186185 A1   Jul. 23, 2009

(30) Foreign Application Priority Data
Sep. 30, 2005  (DK) ................................ 2005 01374

(51) Int. Cl.
  *B29C 43/18*  (2006.01)
  *B32B 3/10*  (2006.01)
(52) U.S. Cl. ............ 428/72; 416/223; 416/232; 428/68; 428/178; 428/188; 428/304.4
(58) Field of Classification Search .................... 428/72, 428/68, 178, 188, 304.4; 416/223, 232
See application file for complete search history.

(56) References Cited

U.S. PATENT DOCUMENTS 3,572,971 A * 3/1971 Seiwert .......................... 416/230
5,308,228 A * 5/1994 Benoit et al. ................... 416/230

FOREIGN PATENT DOCUMENTS

| EP | 0 596 191 A1 | 5/1994 |
| EP | 1 010 793 A1 | 6/2000 |
| JP | 4-214338 | 8/1992 |
| JP | 2002-340350 | 11/2002 |
| JP | 2004-208982 | 7/2004 |
| WO | WO 2004/087410 A1 | 10/2004 |

* cited by examiner

*Primary Examiner* — Brent Ohern
(74) *Attorney, Agent, or Firm* — The Nath Law Group; Jerald L. Meyer; Robert T. Burns

(57) ABSTRACT

The present invention relates to a flexible and drapeable core material for use in a laminate or a sandwich construction comprising at least one exterior of an at least partially permeable material, which exterior forms at least one space into which a filler of freely movable, separate objects is filled. The spaces may be shaped like channels, form a square-shaped pattern or a pattern adapted to the shape of the laminate. The invention further relates to a laminate or a sandwich construction and a blade for a wind turbine featuring such core material and use and manufacture of laminates or sandwich constructions featuring the core material. Moreover the invention relates to a method of manufacturing a core material for use in a laminate or a sandwich construction comprising the steps of forming at least one space from an at least partially permeable material and filling filler into the space.

16 Claims, 3 Drawing Sheets

FORMABLE CORE MATERIAL

The invention relates to a core material for a laminate or a sandwich construction.

BACKGROUND

In the manufacture of composite elements it is often desirable, to obtain the desired structural properties, that a certain thickness, is applied to the element, however, preferably without considerably increasing the weight of the element. This can be obtained by sandwich constructions wherein a comparatively thick and light layer of core material is delimited to both sides by one or more more rigid and stronger layers. As core material, polymer foam is often used, such as foamed PVC, balsa wood or a material having a honeycomb structure. However, those materials are associated with a number of drawbacks. On the one hand, they are comparatively expensive materials and, on the other, it is difficult to adapt the materials to composite elements of rather complex geometries. In particular curved or—even worse—double-curved surfaces present a problem. Here the core material can either be cut to the right dimensions and shapes which, on the one hand, is a very time-consuming and work-intensive process and, on the other, it involves a considerable waste of material, or one may make sections from the one or both sides of the core material, whereby it is more readily adapted to a curved surface. However, the latter entails that the areas where the sections are opened and form wedges are filled with resin during moulding of the composite element which will, in its finished state, exhibit varying strength and rigidity properties through the material.

WO 2004/087410 teaches a fibre-reinforced structure for manufacturing composite elements consisting of two fibre-reinforced layers on each side of a core layer. Here the core layer is made of a quantity of elongate fibre on or between which separate bodies, such as eg hollow glass beads, are secured. The core layer is combined with the fibre layers by sewing. This core layer is more flexible than the above core materials, such as eg balsa wood, but still the core layer cannot be adapted to curved or double-curved surfaces without having to be cut into suitable pieces.

EP 0596191 A1 discloses a fibrous laminated material used as cover layer above fluid absorbing materials, e.g. in connection with diapers, sanitary towels, patches, etc. The fibrous laminate comprises two layers of fibre material put together. The two layers are bonded together in a pattern by passing the layers through two bonding rolls. The two fibre layers are between the bonding areas only put together and thus they are forming a cavity. The bonding areas comprise openings which allow fluid to flow through the fibrous laminate material, and fluid can therefore only flow through the openings in the bonding areas and not into the cavity. Nothing is mentioned about core material in EP 0596191 A1 and the disclosed fibrous laminated material cannot be used as core material.

EP1010793 A discloses a core material to be used in connection with production of fibre reinforced plastic materials in closed moulds. The core material comprises a fibre web comprising a closed cell foam structure comprising 40 vol. % or more and has a free volume accessible by resin of less than 60% vol. The core material can be prepared by printing a foamed or unfoamed binder with micro-spheres (size 4-20 µm) in a non-woven fibre layer. The fibre layer is hereafter dried and heated with the result that the micro-spheres expand (size: 10-100 µm), the binder material cures and sets the micro-spheres in the web, and the micro-spheres would thereafter constitute the closed cell foam structure of the core material. The micro-spheres can further be introduced into the fibre web by using impregnation techniques. Preferably the micro-spheres are placed in regular patters in the fibre web as to form "islands" which are separated by areas (channels) containing no micro-spheres and hereby resin flow into the core material is allowed. The micro-spheres are set in the fibre web and the consequence is that the core material therefore needs to be formed so that it fits the construction prior to use.

OBJECT AND DESCRIPTION OF THE INVENTION

It is the object of the invention to produce a core material for use in a laminate or a sandwich construction, whereby the above-mentioned problems are avoided.

Thus, the present invention relates to a core material for use in a laminate or a sandwich construction, which core material comprises at least an exterior of an at least partially permeable material, which exterior forms at least one space in which a filler of freely movable, separate objects is accommodated. The core material may, equally advantageously, be used both in laminates in general and in sandwich constructions alike. When, in the following, the term "laminates" is used, it is to be understood as comprising sandwich constructions, too. The filler consisting of freely movable, separate objects, the advantageous aspect is obtained that the core material becomes very flexible and, hence, it is very easily adapted and wrapped to all shapes, also eg curved and double-curved shapes. The core material described herein is also advantageous in that it is simple and inexpensive to manufacture and, likewise, it is expedient and very simple to place in a mould.

One embodiment concerns a core material comprising several channel-shaped spaces, several spaces in a square-shaped pattern or spaces in a pattern adapted to the shape of the laminate or sandwich construction. By providing several spaces the filler can be controlled more accurately, and a uniform, even and uniform distribution is ensured even in case the core material is laid on inclining surfaces. By even distribution of the filler an even distribution of the resin in the final laminate or sandwich construction is also ensured, which is of consequence to the final strength of the laminate or the sandwich construction. Moreover, the invention is advantageous in that the amount and kind of filler can be controlled and varied from one space to another in the core material, whose properties such as strength, rigidity, thickness, weight and drapeability can hence be tailor-made for the final laminate or sandwich construction. Likewise the shape as such of the exterior of the core material can be tailor-made to the shape of the laminate or sandwich construction, whereby wrinkles and folds are entirely obviated.

Yet a further embodiment concerns a core material according to the above and comprising spaces that are at least partially situated above one another. Hereby an even distribution of filler is ensured in a simple manner throughout the entire core material, since the comparatively filler-poor areas around joints between two spaces can be divided by an overlapping space. Likewise, it is hereby possible to build even very thick core materials yet without losing its flexibility and drapeability.

According to one embodiment the exterior of the core material is formed of at least one joined layer which is a simple and easy way in which to form spaces.

According to one embodiment of the invention the one layer of the core material is at least partially joined by sewing, gluing or welding, which are simple and expedient joining techniques.

The at least partially permeable material in the core material may be made as web, felt and/or fleece whereby it is ensured that the core material is permeable to the resin during the moulding procedure.

According to the invention, the filler for the core material comprises hollow glass objects or other hollow materials such as eg foamed plastics. These materials are advantageous in that they possess a large volume compared to their weight, and likewise they may serve as reinforcement of the resin in the finished laminate or sandwich construction.

Moreover, the invention relates to a laminate or sandwich construction of several layers of material—in particular a blade for a wind turbine—which comprises a core material according to one or more elements of the above. The advantages of this are, like the subsequent embodiments, like those of the core material as mentioned above.

Likewise the invention relates to a method of manufacturing a core material for use in a laminate or sandwich construction, comprising the steps of forming at least one space of an at least partially permeable material and to add filler to the space. The advantages of this are as mentioned above in the context of the core material.

One embodiment further relates to a method of manufacturing a core material, wherein first spaces are formed by joining of two at least partially permeable layers, following which further one or more spaces are formed at least partially situated above the first spaces by shifted joining of a further layer to the one of the first two layers.

Likewise, the invention relates to a method of manufacturing a laminate or sandwich construction comprising placing of several layers of material in a mould, applying resin and subsequently hardening, and further comprising placing of a core material according to the disclosures above in an area of the mould prior to supply of the resin.

One embodiment relates to a method of manufacturing a laminate or sandwich construction in accordance with the above disclosures, wherein the filler in the core material is fixated by supply of resin.

Finally the invention relates to use of a core material in accordance with the above disclosures for the manufacture of laminates or sandwich constructions.

BRIEF DESCRIPTION OF THE DRAWINGS

In the following, the invention will be described with reference to the figures, wherein.

DESCRIPTION OF EMBODIMENTS

Figure 1:
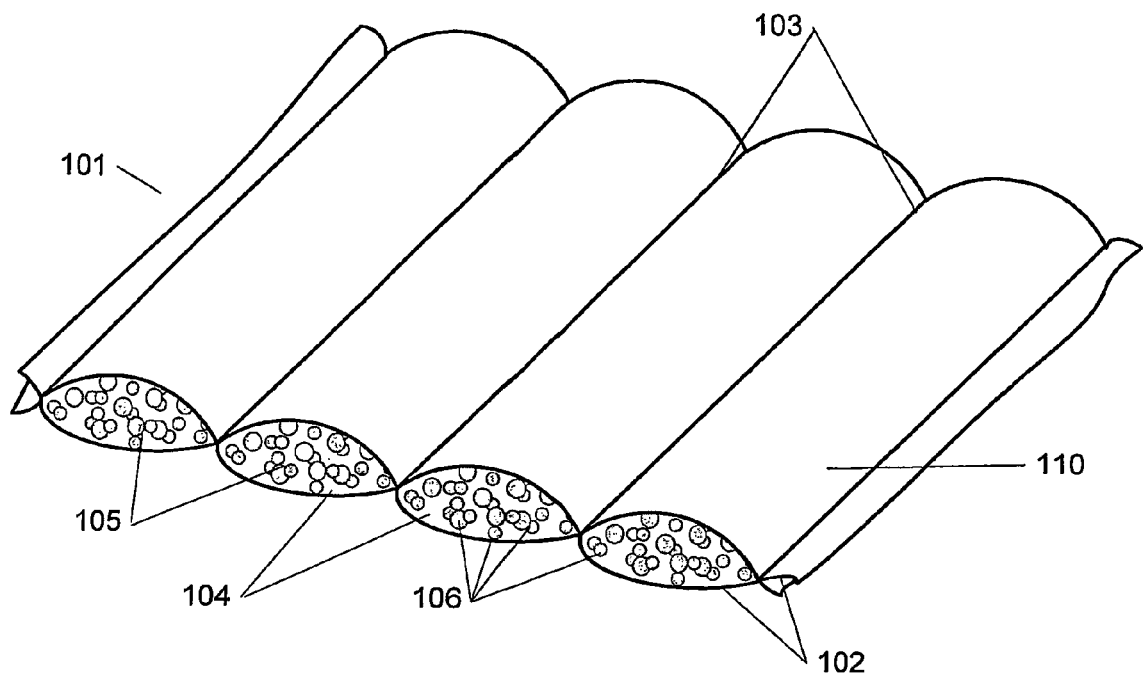
FIG. 1 shows a core material according to the invention with a filler in channels formed of two layers that are joined by sewing.

FIG. 1 outlines a core material 101 according to the invention for use in the manufacture of a laminate or sandwich construction. In the shown embodiment, the core material consists of an exterior 110, being in this case formed from two layers of material 102 that are sewn or otherwise joined with longitudinally extending seams 103 also referred to as joints 103). In spaces 104, being shaped like a channel herein, between the two layers 102, a filler 105 is provided that consists of an amount of separate objects 106. The objects being separate and being able to be pushed and moved about between the layers, the core material is very flexible and is very easily adapted and draped to the desired shape, while simultaneously it is easy to handle. Here the filler is shown to be small beads of different sizes, but it may just as well assume other shapes or be irregular. The filler may be made of a material that does not as such react chemically with the resin. It is important to the choice of material and shape that it has much bulk compared to its weight. Examples of filler may include small hollow glass beads or expanded or foamed plastics such as polystyrene, polyvinylchloride or the like.

The exterior 110 enclosing the filler 105 may, in the most general case, consist of a single layer of material 102, being in one way or another joined to form a space. Different joining techniques are suitable options, such as eg sewing, welding or gluing—by continuous and non-continuous joining alike.

Figure 2:
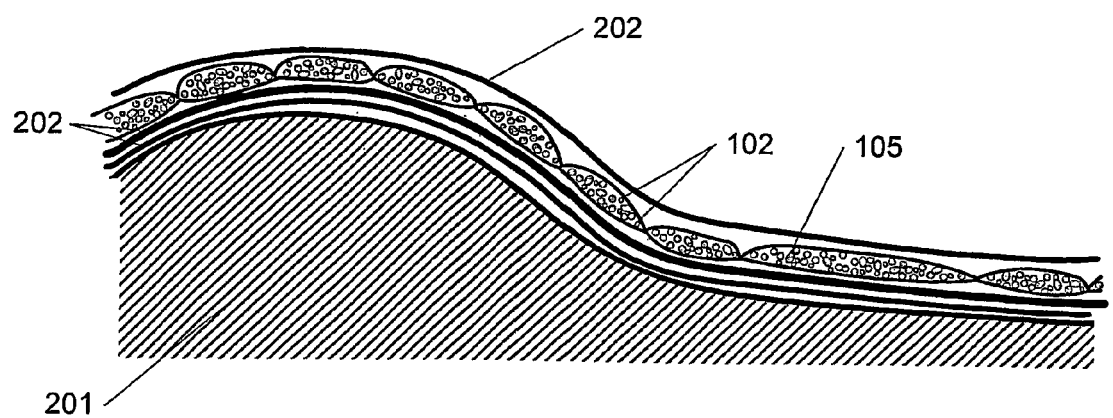
FIG. 2 shows a mould with various material layers during the manufacture of a composite element by the VARTM process (Vacuum Assisted Resin Transfer Moulding).

FIG. 2 outlines a cross-section between a mould 201 in which a laminate is to be produced. In the mould, a number of layers of fibre-reinforced material 202 are first provided, following which the core material 101 is arranged and, above this, a number of further layers 202. If the laminate is made by resin injection under vacuum—the so-called VARTM process (Vacuum Assisted Resin Transfer Moulding)—a number of inlet pipes for the resin are deployed above the material layers that are to partake in the laminate. Then the mould is closed by a vacuum cloth and the resin is supplied. The layer 102 of the core material enclosing the filler 105 is entirely or partially permeable to resin, whereby, during the moulding, the resin is able to penetrate through all layers in the laminate and fill all spaces. The filler in the core material is thus fixated when the resin cures. In the figure, it is outlined how the layers of the laminate are outlined the way in which they are disposed in the mould and prior to application of vacuum. The application of vacuum will press the layers close together. The flexibility of the core material caused by the filler consisting of the separate objects also means that, as mentioned above, the core material can easily be distributed in a mould even if such mould has eg a complex geometry or double curved surfaces. As mentioned above, the layer 102 of the core material has to be entirely or partially penetrable to the resin and may eg be provided as a fleece, a felt or a web of a glass or carbon fibre material.

One example of a laminate manufactured in the way described above is a blade shell for a blade for a wind turbine.

Figure 3:
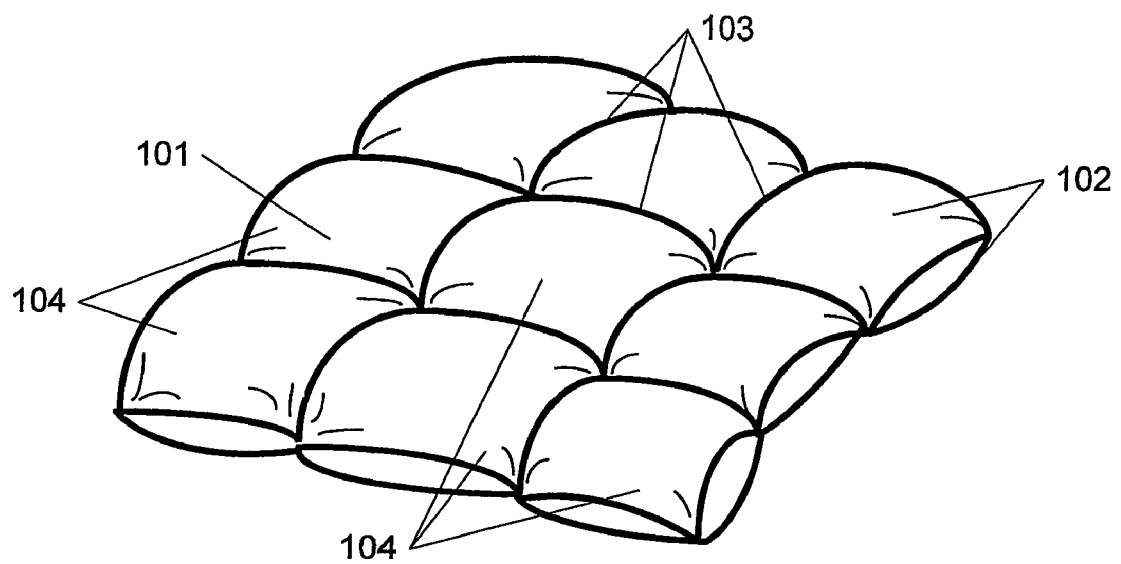
FIGS. 3-4 show different embodiments of the core material with square-shaped cavities.
Figure 4:
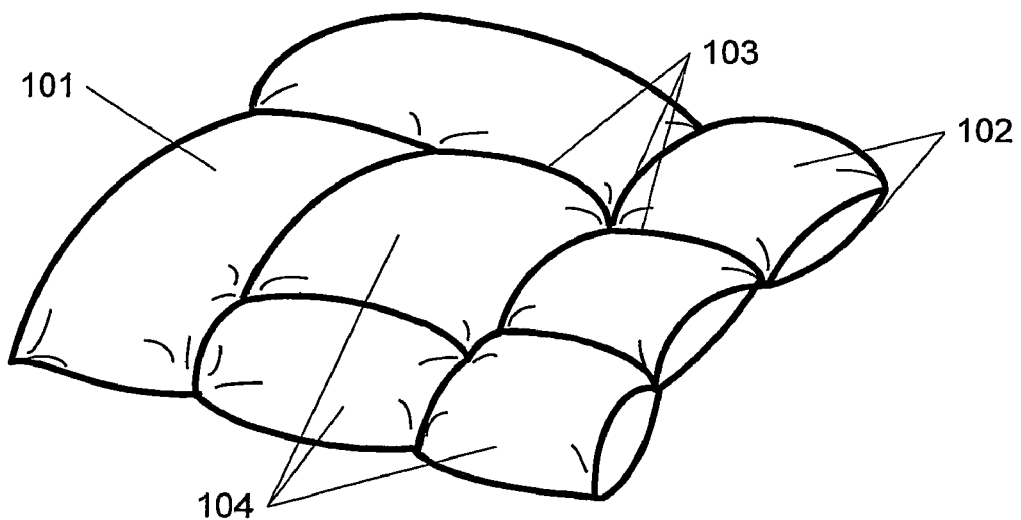

FIGS. 3 and 4 illustrate various other embodiments of a core material 101 according to the invention. In FIG. 3 one or two permeable layers 102 is/are joined by joints 103 criss-cross in a square-shaped pattern. Each square-shaped space 104 is filled with filler (not visible). Such pattern is advantageous in that the filler is hereby maintained within the delimited areas constituted by each square 104, whereby it is ensured that not all filler is eg shifted down into the one end of the core material. An approximately even and uniform distribution of the filler is hereby ensured in a simple manner, while simultaneously the core material is still very flexible and drapeable. The square-shaped pattern may—like the channel-shape shown in FIG. 1—also be produced by providing a number of different spaces of desired shape that are subsequently sewn or otherwise joined.

According to one embodiment, the outer layer 102 of the core material is joined in an irregular pattern as illustrated in FIG. 4. The size and shape of the core material and the distribution of the filler can hereby be adapted to the shape of the final laminate into which the core material is to partake. For instance, it may be advantageous with small fields or spaces 104 in the areas where the mould into which the core material is to be disposed, has much tapering surfaces, whereby it is ensured that the filler does not merely deposit on the bottom of the mould. Correspondingly, large fields 104 may be sufficient for use in case of very flat moulds. Moreover, it is possible to manufacture the core material in other shapes than the approximately planar layers outlined in FIGS. 3 and 4. By joining of the outermost layers to the core material to the effect that the top side of a pattern field is eg larger than its bottom face, the core material will curve, which may be advantageous in the manufacture of correspondingly curved laminates. An example of this is outlined in FIG. 7. It is also possible to fill different fillers into the different spaces and thus, in a simple manner, to tailor the rigidity and strength properties of the core material to different areas in the laminate.

Figure 5:
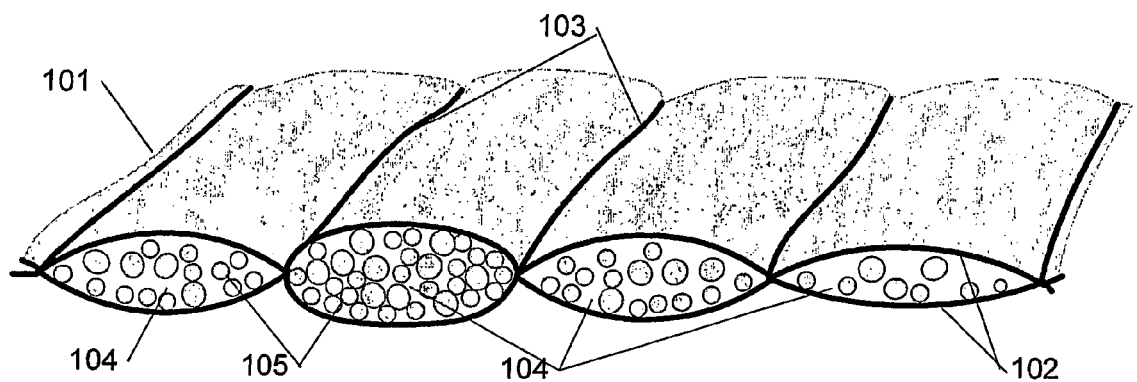
FIG. 5 shows a core material with varying amounts of filler in the cavities.

FIG. 5 is a sectional view through a core material 101 according to the invention, wherein, here, the amount of filler 105 per volume unit varies from space to space 104 throughout the core material. Hereby correspondingly varying thicknesses of the core material in the finished laminate are accomplished.

Figure 6:
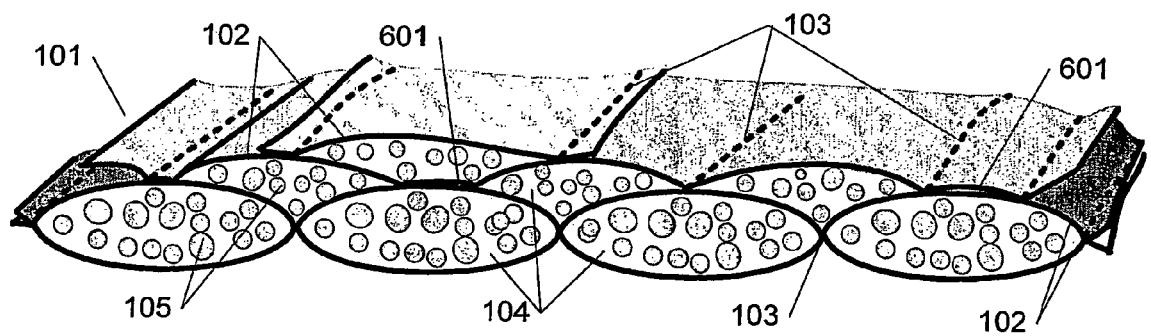
FIG. 6 shows a core material constructed from several layers and with partially overlapping cavities.

FIG. 6 outlines one embodiment of a core material 101, being in this case structured from four layers 102 joined in such a manner that the spaces 104 between the layers are entirely or partially overlapping. This is accomplished in that the joints 103 between the various layers are shifted in relation to each other. Where the two layers are joined there will be a comparatively filler-poor area. However, as outlined in the figure this can be covered by other spaces 104 with filler from the joining of the third layer to the two first ones. Hereby a more even and uniform distribution of the filler 105 throughout the core material is ensured. As also shown in the figure it is also possible to regulate and control the thickness and uniformity of the core material by allowing, in some areas of the core material, two layers 102 to be disposed above each other without arranging any filler there between 601—ie leave some spaces 104 empty.

Figure 7:
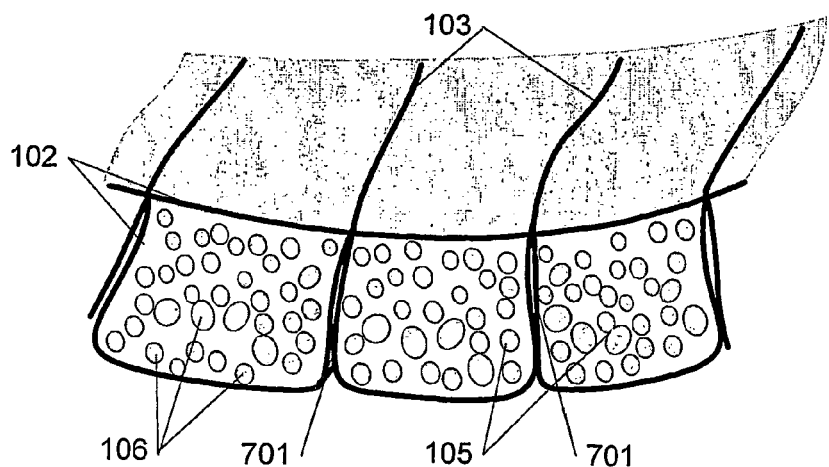
FIG. 7 shows a further embodiment of a core material according to the invention.

Finally, FIG. 7 illustrates an alternative method of joining two layers 102 to a core material according to the invention, whereby a more even distribution of the filler 105 throughout the core material is accomplished without, however, reducing its flexibility and drapeability. Here, the two layers 102 are joined to the effect that, between two joints 103, more of the one layer is used than of the other. Thus, this embodiment can be liked to a conventional core material of eg balsa wood, in which, from the one side, sections or wedges are cut to enable adaptation of the material to a curved surface. However, such wedge-cut material in a curved shape will have hollows between the wedges which will, in a laminate, in turn entail undesirable areas with much resin. This is avoided by use of the flexible core material according to the invention, the "wedges" 701 (the gaps between two spaces 104) not opening even if the material is to follow a curved shape due to the filler being able to distribute and fill the entire mould as it consists of separate objects 106.

A core material with an appearance like the one shown in FIG. 7 can also be manufactured by joining two layers of permeable material with transversal walls.

It will be understood that the invention as disclosed in the present description with figures can be modified or changed while continuing to be comprised by the protective scope of the below claims.

The invention claimed is:

1. A wind turbine blade laminate or a sandwich construction comprising:
   several layers of material, including a core material having at least one exterior of an at least partially permeable material,
   wherein the exterior has several channel-shaped spaces joined by seams and containing a filler of freely movable, separate objects.

2. The wind turbine blade laminate or the sandwich construction according to claim 1, wherein the channel-shaped spaces form a square-shaped pattern.

3. The wind turbine blade laminate or the sandwich construction according to claim 1, wherein the channel-shaped spaces conform to the shape of the laminate.

4. The wind turbine blade laminate or the sandwich construction according to claim 1, wherein the channel-shaped spaces are at least partially overlapping.

5. The wind turbine blade laminate or the sandwich construction according to claim 1, wherein the at least one exterior has at least one joined layer.

6. The wind turbine blade laminate or the sandwich construction according to claim 5, wherein at least one sewed, glued, or welded seam at least partially joins the at least one joined layer.

7. The wind turbine blade laminate or the sandwich construction according to claim 1, wherein the at least partially permeable material is comprised of material selected from the group consisting of web, felt and fleece.

8. The wind turbine blade laminate or the sandwich construction according to claim 1, wherein the filler comprises hollow glass objects.

9. The wind turbine blade laminate or the sandwich construction according to claim 1, wherein the filler comprises foamed plastics.

10. A laminate or a sandwich construction wind turbine blade comprising:
    several layers of material, including a core material having at least one exterior of an at least partially permeable material,
    wherein the exterior has several channel-shaped spaces joined by seams and containing a filler of separate objects.

11. The laminate or a sandwich construction wind turbine blade according to claim 10, wherein the channel-shaped spaces form a square-shaped pattern.

12. The laminate or a sandwich construction wind turbine blade according to claim 10, wherein the channel-shaped spaces conform to the shape of the laminate.

13. The laminate or a sandwich construction wind turbine blade according to claim 10, wherein the channel-shaped spaces are at least partially overlapping.

14. The laminate or a sandwich construction wind turbine blade according to claim 10, wherein the at least one exterior has at least one joined layer.

15. The laminate or a sandwich construction wind turbine blade according to claim 10, wherein at least one sewed, glued, or welded seam at least partially joins the at least one joined layer.

16. The laminate or a sandwich construction wind turbine blade according to claim 10, wherein the at least partially permeable material is comprised of material selected from the group consisting of web, felt and fleece.

* * * * *